US012679538B2

(12) United States Patent
Mendoza et al.

(10) Patent No.: US 12,679,538 B2
(45) Date of Patent: Jul. 14, 2026

(54) ELECTRIC AIRCRAFT

(71) Applicant: Textron Aviation Inc., Wichita, KS (US)

(72) Inventors: Gonzalo Eduardo Mendoza, Wichita, KS (US); Corey Wailes Hagemeister, Wichita, KS (US); Steven Michael Klausmeyer, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/483,338

(22) Filed: Oct. 9, 2023

(65) Prior Publication Data

US 2024/0132212 A1      Apr. 25, 2024
US 2024/0228036 A9      Jul. 11, 2024

Related U.S. Application Data

(60) Provisional application No. 63/380,712, filed on Oct. 24, 2022.

(51) Int. Cl.
*B64C 39/08*          (2006.01)
*B64D 27/31*          (2024.01)

(52) U.S. Cl.
CPC .............. *B64C 39/08* (2013.01); *B64D 27/31* (2024.01)

(58) Field of Classification Search
CPC .......... B64C 39/08; B64D 27/31; B64D 27/33
See application file for complete search history.

(56) References Cited

U.S. PATENT DOCUMENTS

| | | | | |
|---|---|---|---|---|
| 2,339,338 A | * | 1/1944 | Karlik | B64C 17/00 244/46 |
| D195,383 S | * | 6/1963 | Rellis | D12/331 |
| 3,807,665 A | * | 4/1974 | Coombe | B64D 27/00 244/55 |
| 4,390,150 A | * | 6/1983 | Whitener | B64C 39/08 244/45 R |
| 4,901,950 A | * | 2/1990 | Judge | B64C 27/08 244/119 |

(Continued)

FOREIGN PATENT DOCUMENTS

| | | | | |
|---|---|---|---|---|
| CN | 113291466 A | 8/2021 | | |
| EP | 3960632 A1 | * 3/2022 | ............. | B64D 27/02 |

(Continued)

OTHER PUBLICATIONS

Extended European Search Report issued Mar. 15, 2024 in EP Application No. 23205491.6.

*Primary Examiner* — Joshua J Michener
(74) *Attorney, Agent, or Firm* — Avek IP, LLC

(57)          ABSTRACT

An electric aircraft includes a forward wing and an aft wing both located on a top side of a fuselage and both having an upward dihedral angle. The forward wing has a straight or slightly forward-swept leading edge. The aft wing has a swept leading edge. A plurality of propeller engines are located on a leading-edge side of the forward wing. A single propeller engine may be located on a top side of an aft end of the fuselage; alternatively, a plurality of propeller engines are located on the aft wing on either its leading or trailing edge. The propeller engines are each powered by an electric motor. An unobstructed cargo door is located on a side of the fuselage, aft of the forward wing.

21 Claims, 12 Drawing Sheets

(56) References Cited

U.S. PATENT DOCUMENTS

| | | | | |
|---|---|---|---|---|
| 5,106,038 | A * | 4/1992 | Dupont | B64C 1/20 |
| | | | | 244/137.1 |
| D339,319 | S * | 9/1993 | DuPont | D12/337 |
| 10,035,587 | B2 | 7/2018 | Bevirt et al. | |
| 10,071,801 | B2 | 9/2018 | North et al. | |
| 10,144,503 | B1 | 12/2018 | Vander Lind et al. | |
| 10,252,797 | B2 * | 4/2019 | Vondrell | B64C 11/28 |
| 10,377,488 | B1 * | 8/2019 | Reusch | B64U 30/40 |
| 10,676,188 | B2 | 6/2020 | Campbell | |
| 10,974,827 | B2 | 4/2021 | Bevirt et al. | |
| 11,066,159 | B2 | 7/2021 | Karem et al. | |
| 11,453,495 | B1 * | 9/2022 | Alhussan | B64D 27/14 |
| 11,713,103 | B2 * | 8/2023 | Cattin | B64C 1/12 |
| | | | | 244/119 |
| 11,891,164 | B1 * | 2/2024 | Woodworth | B64C 5/08 |
| 2005/0230519 | A1 * | 10/2005 | Hurley | B64C 29/0033 |
| | | | | 244/7 C |
| 2011/0248124 | A1 * | 10/2011 | Fraser | B64C 39/08 |
| | | | | 244/45 R |
| 2015/0183518 | A1 * | 7/2015 | Stuckl | B64C 3/10 |
| | | | | 903/902 |
| 2017/0197709 | A1 | 7/2017 | Fink et al. | |
| 2017/0290214 | A1 * | 10/2017 | Bevirt | B64C 29/0025 |
| 2018/0334251 | A1 * | 11/2018 | Karem | B64C 13/18 |
| 2020/0115045 | A1 | 4/2020 | Mermoz et al. | |
| 2020/0164976 | A1 * | 5/2020 | Lovering | B64C 29/0033 |
| 2020/0277065 | A1 * | 9/2020 | Thomassin | B64D 27/33 |
| 2021/0229802 | A1 * | 7/2021 | Karem | B64C 27/10 |
| 2021/0380245 | A1 | 12/2021 | Rewerts et al. | |
| 2022/0281593 | A1 | 9/2022 | Stobbe et al. | |

FOREIGN PATENT DOCUMENTS

| | | | |
|---|---|---|---|
| WO | 2018217667 | A1 | 11/2018 |
| WO | 2019232472 | A1 | 12/2019 |

* cited by examiner

300

326

325

324

323

322

321

ELECTRIC AIRCRAFT

CROSS-REFERENCE TO RELATED APPLICATIONS

This application claims the benefit of priority of U.S. Provisional Patent Application No. 63/380,712, entitled Electric Aircraft and filed on Oct. 24, 2022, the disclosure of which is herein incorporated by reference in its entirety.

BACKGROUND

1. Field

Embodiments of the invention relate generally to electric aircraft, and more specifically to a mid-range electric aircraft for transporting cargo.

2. Description of the Related Art

Many types of electric aircraft are known. U.S. Pat. No. 10,035,587 to Bevirt et al. describes a VTOL tri-rotor aircraft with two rotors mounted on forward wing tips, and the three rotors may be powered by electric motors. U.S. Pat. No. 10,974,827 to Bevirt et al. describes a tri-rotor VTOL aircraft, and the rotors may be powered by electric motors. U.S. Pat. No. 10,071,801 to North et al. describes a tri-rotor VTOL aircraft, and the three rotors may be powered by electric motors. U.S. Pat. No. 10,676,188 to Campbell et al. describes a tilt-rotor aircraft with two forward rotors and one aft rotor, and the three rotors may be powered by electric motors.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, an electric aircraft includes a forward wing on a top side of a fuselage, wherein the forward wing includes an upward dihedral angle; an aft wing on the top side of the fuselage, wherein the aft wing includes an upward dihedral angle a swept leading edge; a first propeller engine on the forward wing and a second propeller engine, opposite the first propeller engine, on the forward wing; a third propeller engine on top side of an aft end of the fuselage, wherein the first propeller engine, the second propeller engine, and the third propeller engine each include an electric motor; and an unobstructed cargo door located on a side of the fuselage aft of the forward wing wherein the unobstructed cargo door is configured for receiving cargo into a cargo area of the fuselage.

In another embodiment, an electric aircraft includes a forward wing on a top side of a fuselage, wherein the forward wing includes an upward dihedral angle; an aft wing on the top side of the fuselage, wherein the aft wing includes an upward dihedral angle a swept leading edge; a plurality of forward propeller engines on the forward wing, wherein the forward propeller engines each include an electric motor; a plurality of aft propeller engines on the aft wing, wherein the aft propeller engines each include an electric motor; and an unobstructed cargo door located on a side of the fuselage aft of the forward wing, wherein the unobstructed cargo door is configured for receiving cargo into a cargo area of the fuselage.

BRIEF DESCRIPTION OF THE DRAWING FIGURES

Embodiments of the invention are described in detail below with reference to the attached drawing figures, wherein.

Figure 1:
FIG. 1 is a front view of an embodiment of an electric aircraft.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 2:
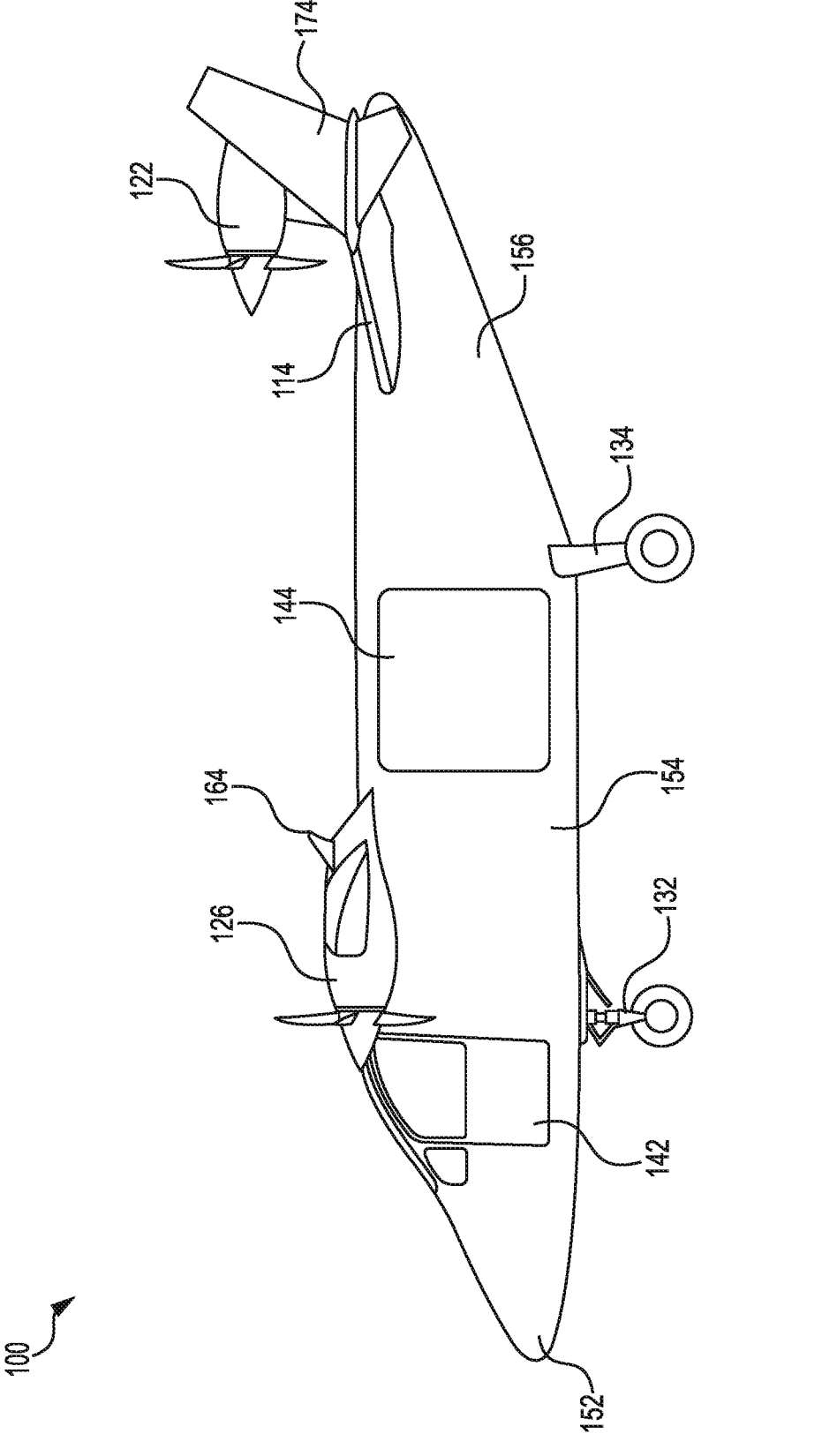
FIG. 2 is a side view of the electric aircraft of FIG. 1.
Figure 3:
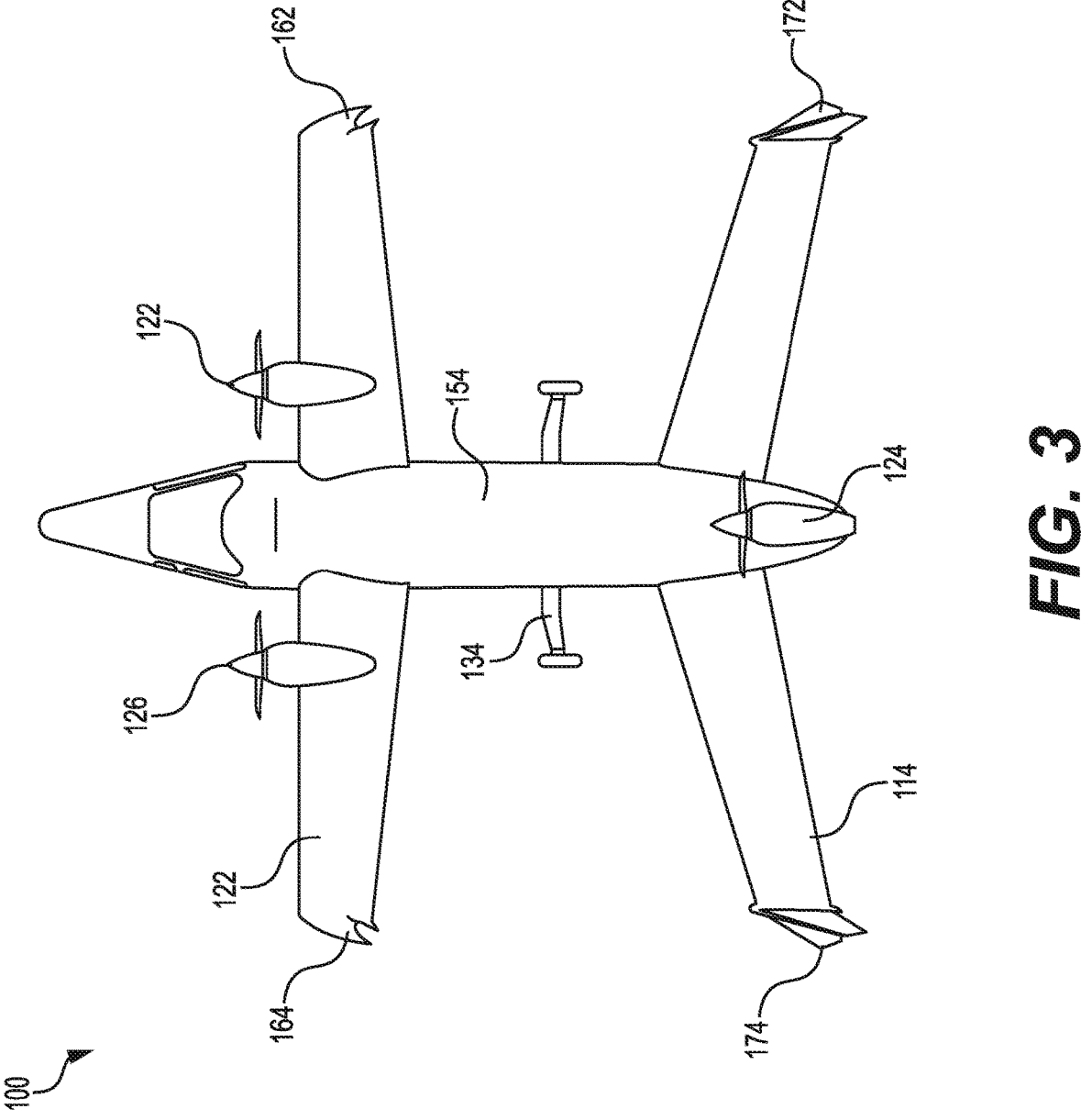
FIG. 3 is a top view of the electric aircraft of FIG. 1.

FIG. 1 is a front view of an exemplary electric aircraft 100. FIG. 2 is a side view of electric aircraft 100. FIG. 3 is a top view of electric aircraft 100. FIGS. 1-3 are best viewed together with the following description. In embodiments, electric aircraft 100 includes three electrically driven propeller engines: a starboard-side propeller engine 122, an aft propeller engine 124, and a port-side propeller engine 126. As best viewed in FIG. 3, starboard-side propeller engine 122 and port-side propeller engine 126 are located on a forward wing 112, and aft propeller engine 124 is located on an aft end of the aircraft. In embodiments, each of propeller engines 122, 124, 126 includes an electric motor. The propeller engines 122, 124, 126 are configured as fixed orientation rotors that remain in the forward-facing position (i.e., the rotors are not tiltable).

In embodiments, electrical energy may be provided to the electric motors via one or more batteries, turbogenerators (e.g., one or more of a turbine, diesel, or gas engine configured to drive electrical generators), or a hydrogen fuel cell, for example.

In some embodiments, as best viewed in FIG. 2, a nose landing gear 132 has a single wheel located towards a nose of the aircraft, and a main landing gear 134 has two wheels located towards an aft end of a fuselage 154. A cockpit door 142 provides access to the cockpit. A cargo door 144 provides a large and unobstructed entryway configured for loading and unloading cargo in and out of fuselage 154. The cargo door 144 is unobstructed from the forward wing 112 by being located aft of the forward wing; the cargo door 144 is unobstructed from the main landing gear 134 by being located forward of the main landing gear 134. A main section of the fuselage 154 includes a cargo area configured for receiving cargo, including cargo containers or pallets.

Electric aircraft 100 includes a nose section 152 at a forward end of the main fuselage 154 and a tail section 156 at an aft end of the main fuselage 154. A bottom side of the tail section 156 is angled upwardly from the main fuselage 154, whereas a top side of the tail section 156 extends in a continuous straight line from a top side of the fuselage 154. Aft wing 114 extends laterally from tail section 156, substantially near the top side of tail section 156 as shown in FIG. 2.

In some embodiments, forward wing 112 may also extend substantially from a top portion of fuselage 154 as shown in FIG. 2. As best viewed in FIG. 1, forward wing 112 and aft wing 114 may comprise a slight dihedral (e.g., upward) angle such that the wing tips are higher than the aircraft fuselage 154.

In some embodiments, as best viewed in FIG. 3, forward wing 112 comprises a straight (i.e., unswept) leading edge and a tapered trailing edge such that forward wing 112 is narrower at a tip of the wing. In other embodiments (not shown), forward wing 112 comprises a slightly forward-swept leading edge.

Each tip of forward wing 112 comprises a forward winglet 162, 164. In embodiments, the forward winglets 162, 164 comprise split divergent winglets as described in U.S. Non-provisional patent application Ser. No. 18/337,130 and U.S. Design application Nos. 29/843,103 and 29/843,109, which are herein incorporated by reference in their entirety.

An aft wing 114 comprises a swept wing, in embodiments, in which both the leading edge and the trailing edge of aft wing 114 are swept aftwards. Each end of aft wing 114 comprises an aft winglet 172, 174. In embodiments, the aft winglets 172, 174 each comprise a split winglet with an upward portion angled upwardly from a tip of aft wing 114 and a downward portion angled downwardly from the tip of aft wing 114.

Figure 4:
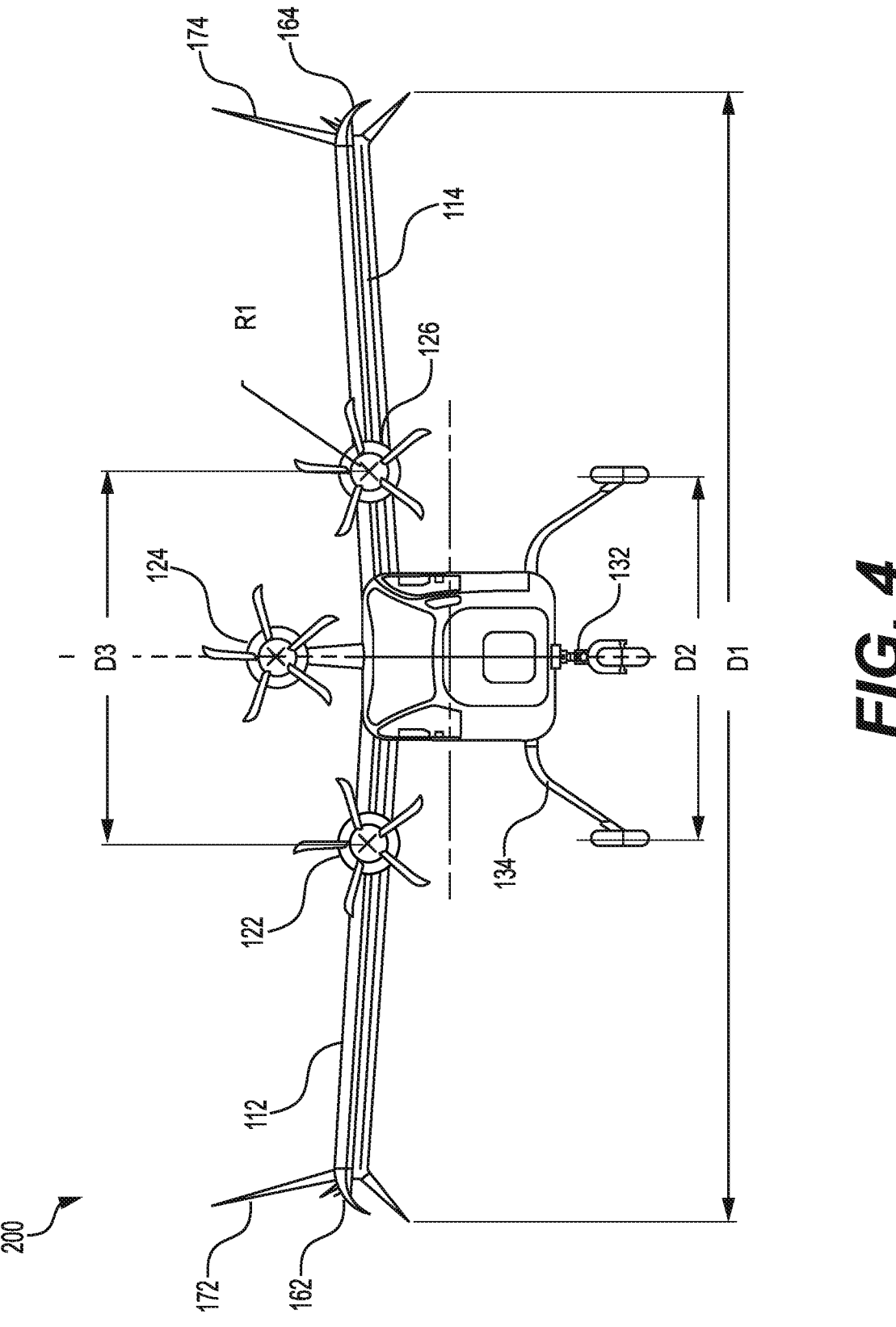
FIG. 4 is a front view of another embodiment of an electric aircraft.
Figure 5:
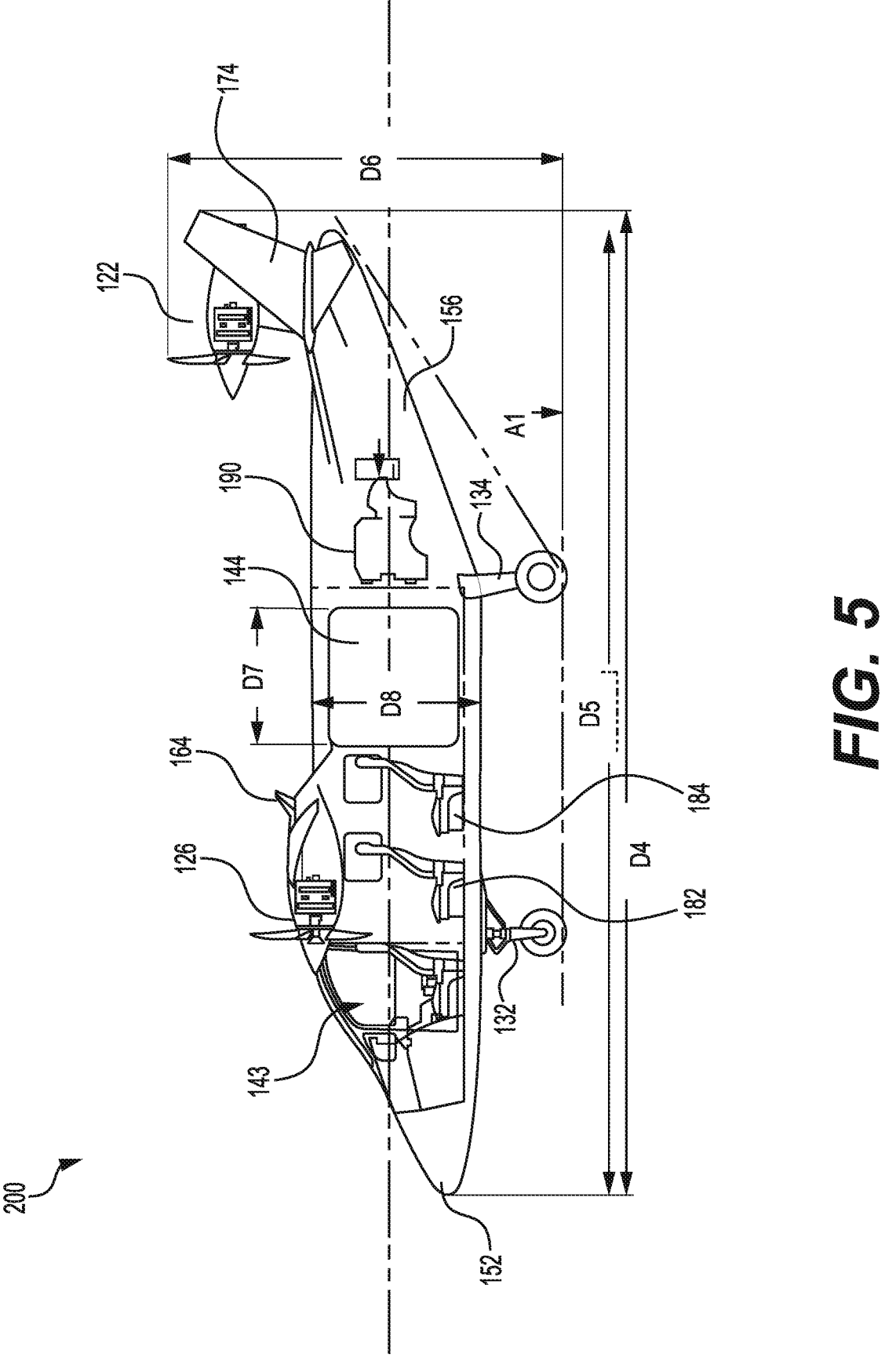
FIG. 5 is a side view of the electric aircraft of FIG. 4.
Figure 6:
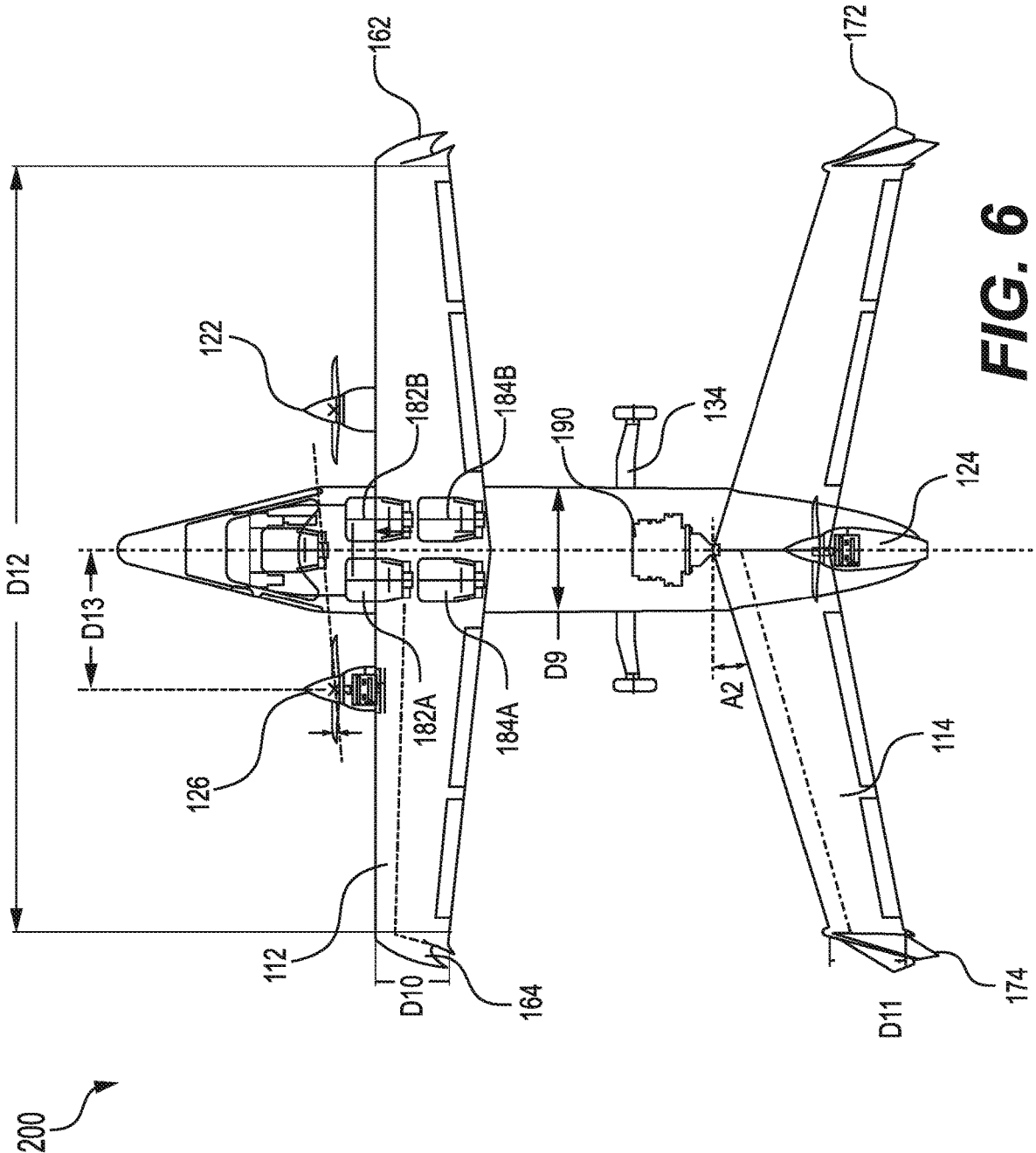
FIG. 6 is a top view of the electric aircraft of FIG. 4.

FIG. 4 is a front view of an exemplary electric aircraft 200. Electric aircraft 200 is an example of electric aircraft 100. Items enumerated with like numbers are the same or similar and their description may not be repeated accordingly. Electric aircraft 200 is configured for passenger seating combined with cargo loading to provide a hybrid passenger/cargo configuration. FIG. 5 is a side view of electric aircraft 200 with portions of the fuselage wall and cockpit door removed to enable viewing of internal components. FIG. 6 is a top view of electric aircraft 200 with see-through portions to enable viewing of internal components. FIGS. 4-6 are best viewed together with the following description.

As shown in FIG. 4, a first distance D1 is a maximum lateral (e.g., spanwise) distance between the outermost tips of aft winglets 172, 174. In embodiments, D1 is about 300-inches to about 450-inches. In some embodiments, D1 is about 350-inches to about 400-inches. In certain embodiments, D1 is about 370-inches to about 380-inches. A second distance D2 is a distance between wheels of main landing gear 134. For example, D2 may be a center-to-center distance between the center of each wheel of main landing gear 134. In embodiments, D2 is about 100-inches to about 200-inches. In some embodiments, D2 is about 115-inches to about 125-inches. In certain embodiments, D2 is about 120-inches to about 121-inches. A third distance D3 is a distance between starboard-side propeller engine 122 and port-side propeller engine 126. For example, D3 may be a center-to-center distance between the center of each propeller engine 122, 126 on forward wing 112. In embodiments, D3 is about 100-inches to about 200-inches. In some embodiments, D3 is about 120-inches to about 130-inches. In certain embodiments, D3 is about 123-inches to about 125-inches.

Each propeller of propeller engines 122, 124, 126 has a radius which is the distance from the center of the propeller hub to the outermost tip of each blade of the propeller. A first radius R1, depicted in FIG. 4, is a propeller radius of port-side propeller engine 126. In embodiments, R1 is about 40-inches to about 60-inches. In some embodiments, R1 is about 45-inches to about 50-inches. In certain embodiments, R1 is about 47-inches to about 49-inches. In embodiments, the propeller of propeller engines 122, 124, 126 all have the same first radius R1. However, aft propeller engine 124 may have a different propeller radius from the others without departing from the scope hereof.

As shown in FIG. 5, a first row of seats 182 is located behind a cockpit 143. A second row of seats 184 is located behind the first row of seats 182. Each row of seats 182, 184 may include one or more seats (see e.g., FIG. 6). A turbogenerator 190 is depicted for embodiments configured with hybrid power generation (e.g., having a turbine or piston gas generator powering the electric propulsion).

A fourth distance D4 is a maximum longitudinal distance from a forward-most tip of nose section 152 to the aftmost tip of aft winglets 172, 174. In embodiments, D4 is about 300-inches to about 450-inches. In some embodiments, D4 is about 350-inches to about 375-inches. In certain embodiments, D4 is about 364-inches to about 366-inches. A fifth distance D5 is a longitudinal distance from a forward-most tip of nose section 152 to the aftmost tip of tail section 156. In embodiments, D5 is about 300-inches to about 450-inches. In some embodiments, D5 is about 350-inches to about 375-inches. In certain embodiments, D5 is about 356-inches to about 358-inches. In the FIG. 5 embodiment, D5 is greater than D4; however, the aft winglets 172, 174 may be reduced in size such that D5 is equal to or smaller than D4.

A sixth distance D6 is a maximum height of electric aircraft 200, extending in the vertical direction from the ground (when nose landing gear 132 and main landing gear 134 are deployed) to an uppermost tip of the propeller blades of the starboard-side propeller engine 122. In embodiments, D6 is about 100-inches to about 200-inches. In some embodiments, D6 is about 140-inches to about 150-inches. In certain embodiments, D6 is about 144-inches to about 146-inches.

A seventh distance D7 is a width of cargo door 144. In embodiments, D7 is about 25-inches to about 75-inches. In some embodiments, D7 is about 40-inches to about 60-inches. In certain embodiments, D7 is about 50-inches to about 51-inches. An eighth distance D8 is a height of the fuselage in the vertical direction. In embodiments, D8 is about 55-inches to about 70-inches. In some embodiments, D8 is about 60-inches to about 65-inches. In certain embodiments, D8 is about 62-inches to about 64-inches.

A first angle A1 is the angle between the bottom of main landing gear 134 and the aft end of tail section 156, as depicted in FIG. 5. In embodiments, A1 is about 20-degrees to about 45-degrees. In some embodiments, A1 is about 30-degrees to about 35-degrees. In certain embodiments, A1 is about 31-degrees to about 33-degrees.

As shown in the FIG. 6 embodiment, first row of seats 182 may include a left seat 182A and a right seat 182B. Likewise, second row of seats 184 may include a left seat 184A and a right seat 184B. A nineth distance D9 is a width of the fuselage in the lateral direction. In embodiments, D9 is about 40-inches to about 70-inches. In some embodiments, D9 is about 50-inches to about 60-inches. In certain embodiments, D9 is about 54-inches to about 56-inches.

A tenth distance D10 is a chordwise width of forward wing 112 at its wingtip (i.e., at the end of the outboard end of the wing not including forward winglets 162, 164). In embodiments, D10 is about 25-inches to about 40-inches. In some embodiments, D10 is about 30-inches to about 40-inches. In certain embodiments, D10 is about 32-inches to about 34-inches. An eleventh distance D11 is a chordwise width of aft wing 114 at its wingtip (i.e., at the end of the outboard end of the wing not including aft winglets 172, 174). In embodiments, D11 is about 25-inches to about 40-inches. In some embodiments, D11 is about 30-inches to about 40-inches. In certain embodiments, D11 is about 32-inches to about 34-inches.

A twelfth distance D12 is a lateral (e.g., spanwise) distance of forward wing 112 from wingtip to wingtip not including forward winglets 162, 164. In embodiments, D12 is about 300-inches to about 400-inches. In some embodiments, D12 is about 330-inches to about 350-inches. In certain embodiments, D12 is about 339-inches to about 341-inches. The maximum lateral distance D1 between the outermost tips of aft winglets 172, 174, may match, exceed, or be smaller by some amount to the distance D12. In some embodiments, the distance D1 is closely matched to the distance D12. In other embodiments, the distance D1 exceeds D12 by 10-20 inches. In certain embodiments, the distance D1 may be 30-60 inches shorter than D12.

A thirteenth distance D13 is a lateral distance from a longitudinal centerline of the aircraft to the center of the port-side propeller engine 126. In embodiments, D13 is about 40-inches to about 80-inches. In some embodiments, D13 is about 60 to about 65 inches. In certain embodiments, D13 is about 61 to about 63 inches. Although not depicted in the figures, starboard-side propeller engine 122 is symmetrically arranged such that the lateral distance from the longitudinal centerline of the aircraft to the center of the starboard-side propeller engine is equal to D13.

A second angle A2 is the angle at which the leading edge of aft wing 114 is swept backward from a lateral axis. In embodiments, A2 is about 5-degrees to about 35-degrees. In some embodiments, A2 is about 15-degrees to about 20-degrees. In certain embodiments, A2 is about 16-degrees to about 18-degrees.

Figure 7:
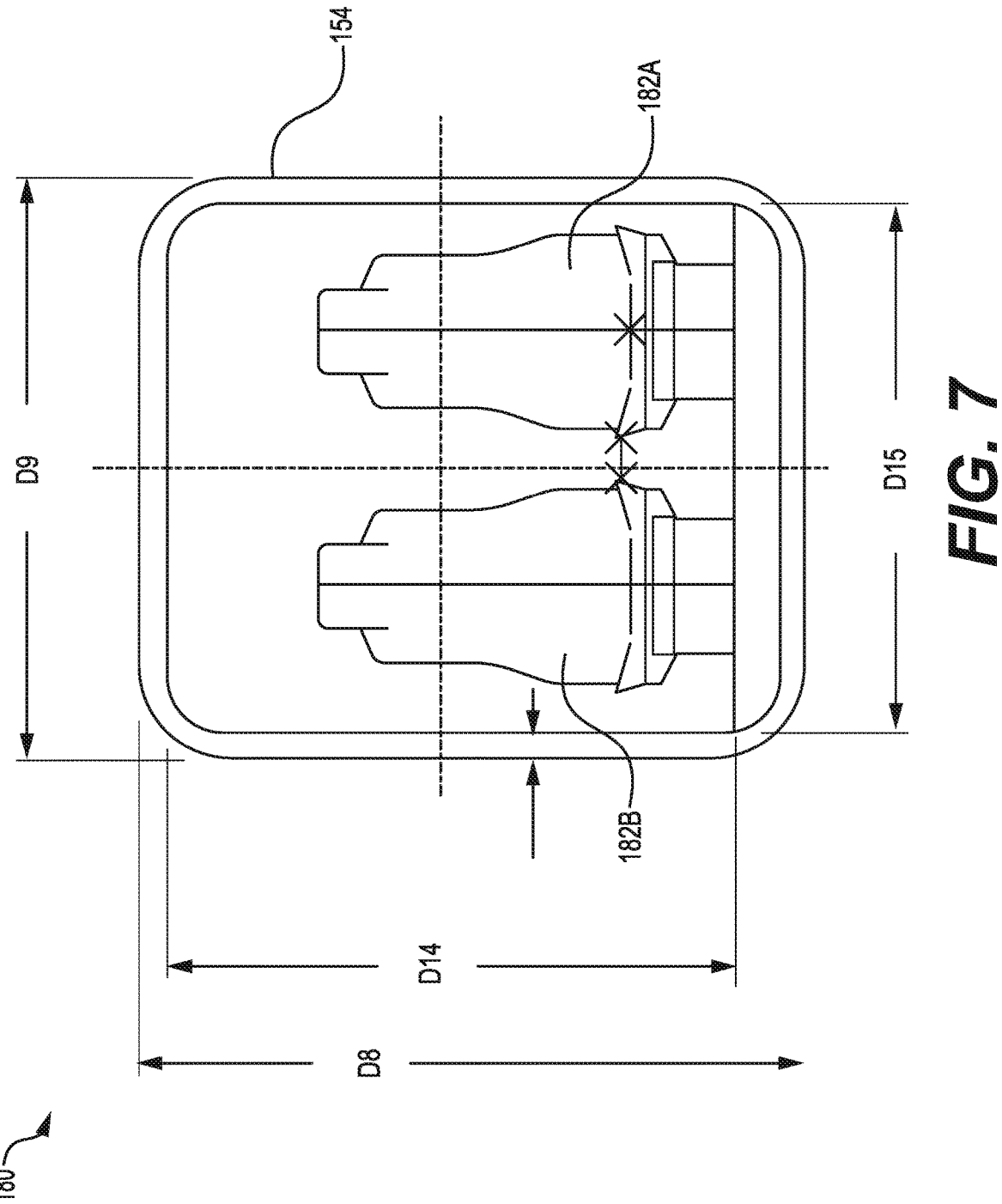
FIG. 7 is a front view of a passenger seating arrangement, in an embodiment, for the electric aircraft of FIG. 4.

FIG. 7 is a front view of a passenger seating arrangement 180 for electric aircraft 200. A fourteenth distance is an interior height of the fuselage in the vertical direction at the front row of seats 182. In embodiments, D14 is about 50-inches to about 60-inches. In some embodiments, D14 is about 52-inches to about 56-inches. In certain embodiments, D14 is about 53-inches to about 55-inches. A fifteenth distance D15 is an interior width of the fuselage in the lateral direction at the front row of seats 182. In embodiments, D15 is about 40-inches to about 60-inches. In some embodiments, D15 is about 45-inches to about 55-inches. In certain embodiments, D15 is about 48-inches to about 50-inches.

Figure 8:
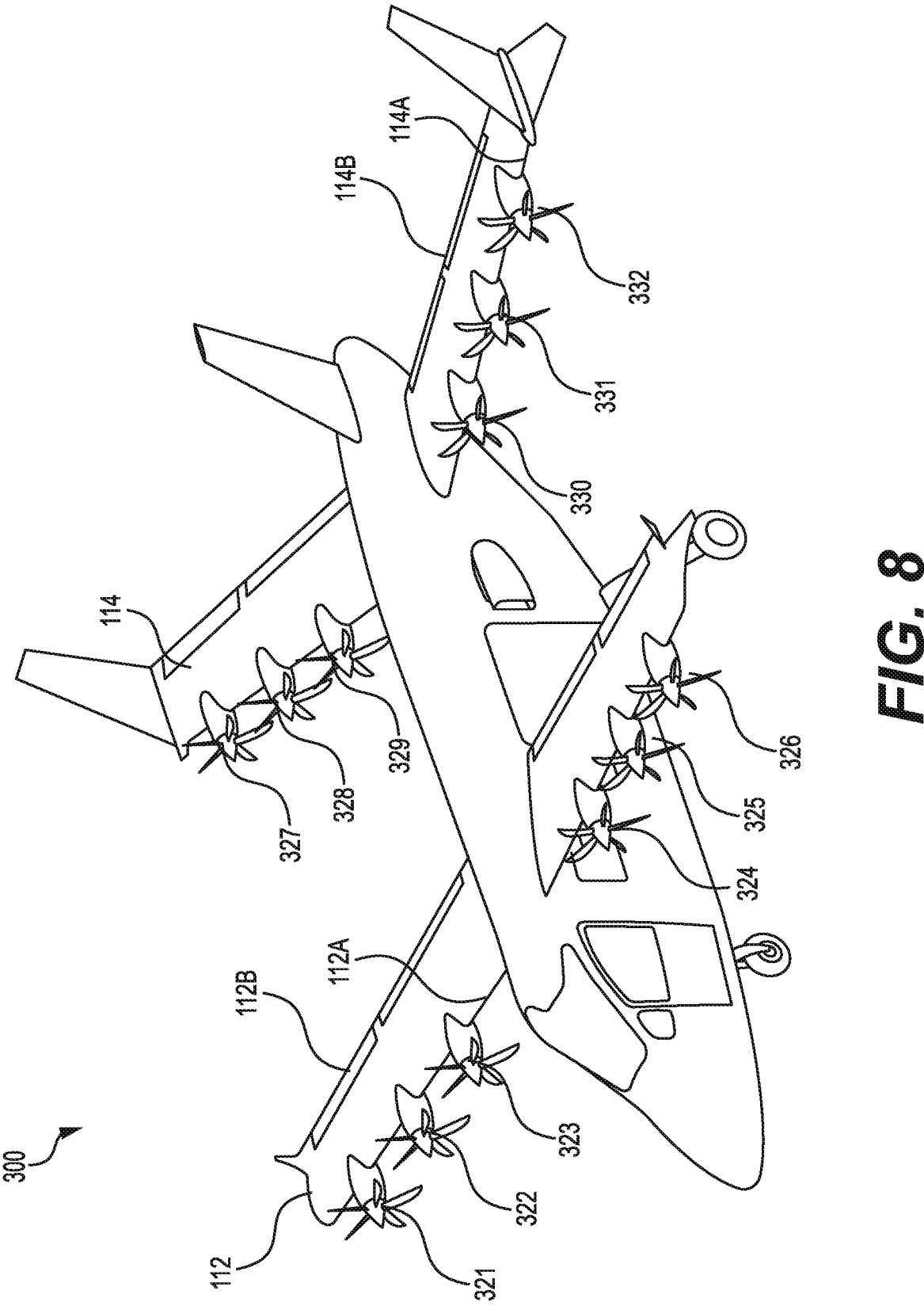
FIG. 8 is a perspective view of another embodiment of an electric aircraft.
Figure 9:
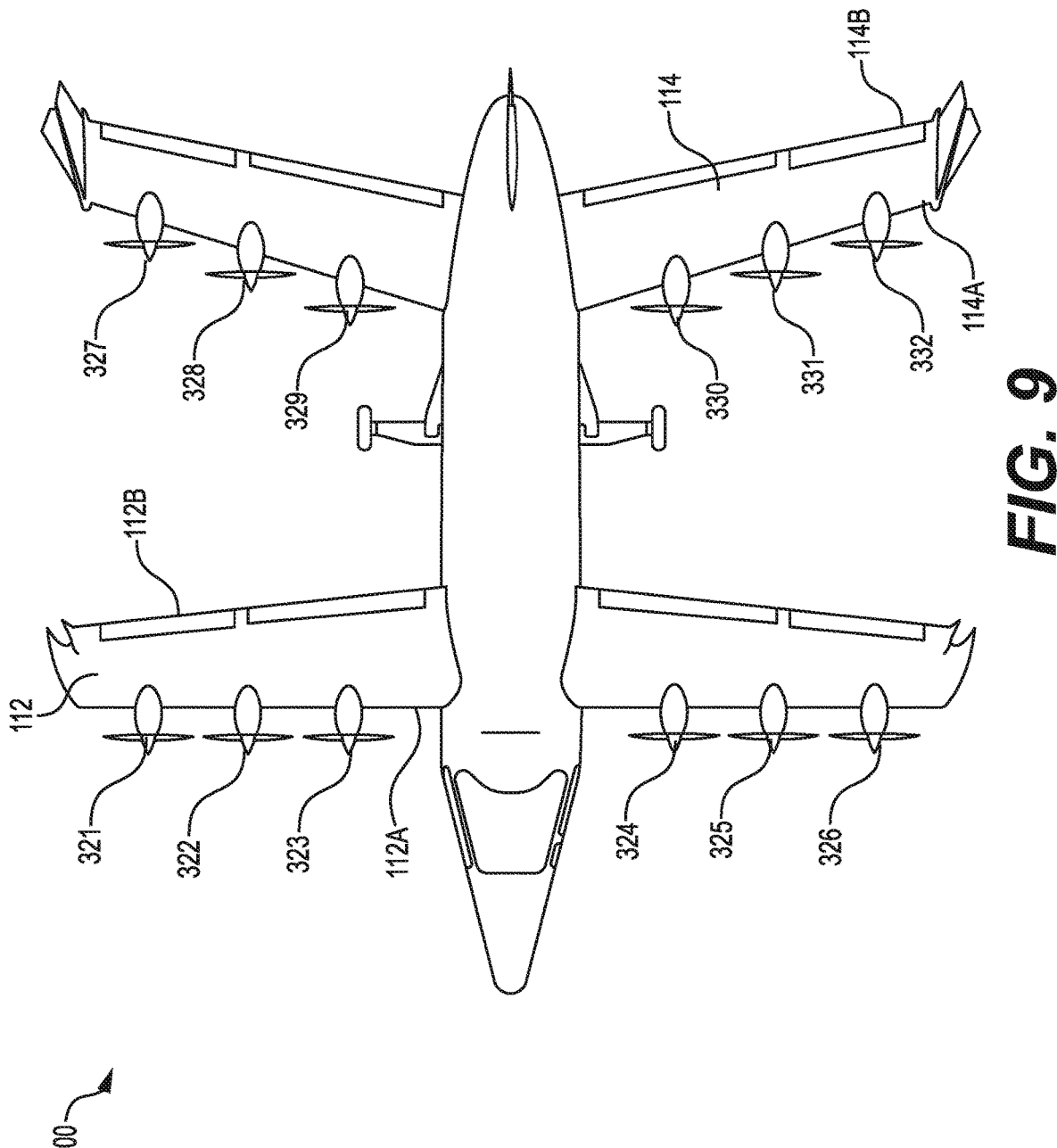
FIG. 9 is a top view of the electric aircraft of FIG. 8.
Figure 10:
FIG. 10 is a front view of the electric aircraft of FIG. 8.

FIG. 8, FIG. 9, and FIG. 10 show an electric aircraft 300 having a plurality of propeller engines along a leading edge 112a of the forward wing 112 and a leading edge 114a of the aft wing 114, instead of the three-propeller engine arrangement of electric aircraft 100/200. For example, as shown in FIG. 8-10, six propeller engines 321-326 are disposed along the leading edge 112a side, with first, second, and third propeller engines 321, 322, 323 on the righthand side, and fourth, fifth, and sixth propeller engines 324, 325, 326 on the lefthand side. No propeller engines are disposed on the trailing edge 112b side of the forward wing 112. Similarly, as shown in FIG. 8 and FIG. 9, six propeller engines 327-332 are disposed along the leading edge 114a side, with seventh, eighth, and ninth propeller engines 327, 328, 329 on the righthand side, and tenth, eleventh, and twelfth propeller engines 330, 331, 332 on the lefthand side. In some embodiments, the plurality of propeller engines are disposed along the leading edge of either the forward wing 112 or the aft wing 114. Electric aircraft 300 may have greater or fewer than twelve engines without departing from the scope hereof Due to the larger number of engines, each of propeller engines 321-332 is smaller compared with the propeller engines 122, 124, and 126 of electric aircraft 100/200. The larger number (e.g., twelve) of smaller engines allows for a more distributed propulsion arrangement which may be used to provide improved field performance. In embodiments, the propeller engines are fixed in the forward-facing position (i.e., the rotors are not tiltable).

Figure 11:
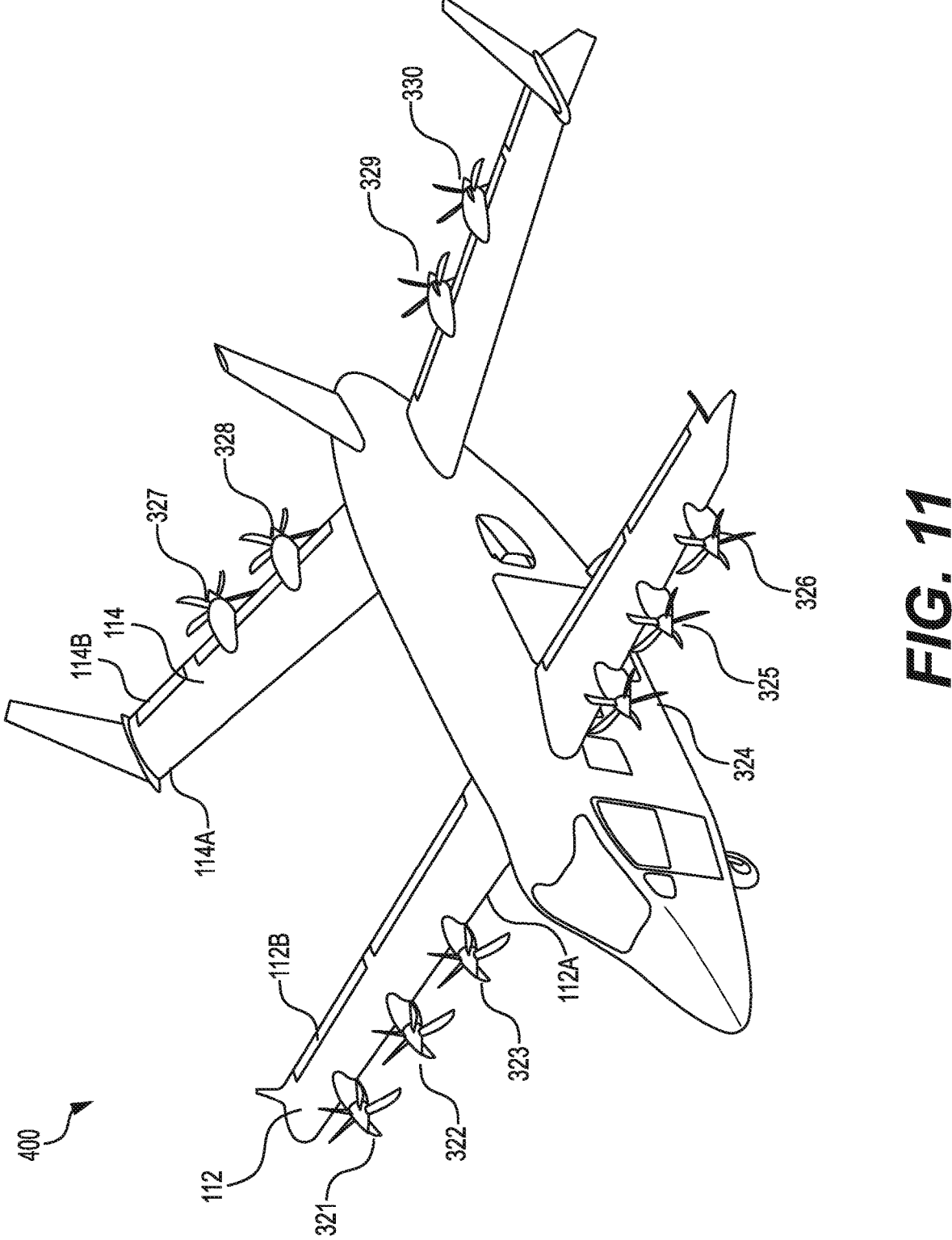
FIG. 11 is a perspective view of another embodiment of an electric aircraft.
Figure 12:
FIG. 12 is a top view of the electric aircraft of FIG. 11.

FIG. 11 and FIG. 12 show an electric aircraft 400, which is similar to electric aircraft 300 in that it includes a plurality of smaller non-tiltable propeller engines on the forward and aft wings 112, 114. Like electric aircraft 300, electric aircraft 400 has six propeller engines 321-326 on leading edge 112a of forward wing 112. On aft wing 114, the propeller engines are disposed on a trailing edge 114b side instead of the leading edge 114a side. In the embodiment shown in FIG. 11 and FIG. 12, four propeller engines 327-330 are disposed along trailing edge 114b, with seventh and eighth propeller engines 327, 328 on the righthand side, and ninth and tenth propeller engines 329, 330 on the lefthand side. The propeller engines disposed on the leading edge side of a wing (e.g., propeller engines 321-326 on leading edge 112a) are configured as tractor propeller engines to pull the aircraft forward, while the propeller engines disposed on the trailing edge side of a wing (e.g., propeller engines 327-330 on trailing edge 114b) are configured as pusher propeller engines to push the aircraft forward.

In operation, electric aircraft 100, 200, 300, and 400 are configured for operating with a power loading of about 10-lb/HP to about 20-lb/HP, in embodiments. Electric aircraft 100/200/300/400 are configured for operating with a wing loading of about 10-lb/ft$^2$ to about 20-lb/ft$^2$. In embodiments, electric aircraft 100/200/300/400 are configured to have a takeoff distance of about 100-ft to about 400-ft. In some embodiments, the takeoff distance is about 200-ft to about 300-ft. The short takeoff distance of electric aircraft 100/200/300/400 may allow them to take off from airfields that are also used by vertical-takeoff and landing (VTOL) aircraft. In embodiments, electric aircraft 100/200/300/400 are configured to have a maximum takeoff weight of about 4,000-lbs to about 25,000-lbs. In some embodiments, the maximum takeoff weight is about 6,000-lbs to about 10,000-lbs. Additionally, airspeed of electric aircraft 100/200/300/400, in embodiments, is less than 250-knots, which provides a range of about 1,500 nautical miles (nm) or less. Depending on the payload onboard electric aircraft 100/200/300/400, the range may be from 500-nm to 1000-nm. In some embodiments, the range is between 550-nm and 650-nm.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An electric aircraft, comprising:
a forward wing on a top side of a fuselage, wherein the forward wing comprises an upward dihedral angle;
an aft wing on the top side of the fuselage, wherein the aft wing comprises an upward dihedral angle and a swept wing in which both a leading edge and a trailing edge of the aft wing are swept aftwards;
a first propeller engine on the forward wing and a second propeller engine, opposite the first propeller engine, on the forward wing;
a third propeller engine on top side of an aft end of the fuselage, wherein the first propeller engine, the second propeller engine, and the third propeller engine each comprise an electric motor, and the first propeller engine, the second propeller engine, and the third propeller engine are each configured as fixed orientation rotors that remain in a forward-facing position;
an unobstructed cargo door located on a side of the fuselage aft of the forward wing wherein the unobstructed cargo door is configured for transferring cargo into and out of a cargo area of the fuselage;
a cockpit door located forward of the forward wing;
at least one row of seats located behind a cockpit and in front of the cargo area; and
a main landing gear, wherein the main landing gear is located aft of the unobstructed cargo door.

2. The electric aircraft of claim 1, wherein the forward wing comprises a straight unswept leading edge and a trailing edge that is angled forward such that the forward wing becomes narrower towards a tip of the wing.

3. The electric aircraft of claim 1, wherein the electric aircraft is configured to operate with a power loading of about 10-lb/HP to about 20-lb/HP.

4. The electric aircraft of claim 1, wherein the electric aircraft is configured to operate with a wing loading of about 10-lb/ft$^2$ to about 20-lb/ft$^2$.

5. The electric aircraft of claim 1, wherein the electric aircraft is configured to have a takeoff distance of about 100-ft to about 400-ft.

6. The electric aircraft of claim 1, wherein the electric aircraft is configured to have a maximum takeoff weight of about 6,000-lbs to about 10,000-lbs.

7. The electric aircraft of claim 1, wherein the electric aircraft is configured to have a maximum airspeed of about 250-knots.

8. The electric aircraft of claim 1, wherein the electric aircraft is configured to have a maximum range of about 1,500 nautical miles.

9. The electric aircraft of claim 1, wherein the aft wing comprises a winglet on each end and a maximum spanwise distance between outermost tips of the winglet on each end is about 350-inches to about 400-inches.

10. The electric aircraft of claim 1 comprising a nose section at a forward end of the fuselage and a tail section at an aft end of the fuselage, wherein a maximum longitudinal distance from a forward-most tip of the nose section to an aftmost tip of tail section is about 300-inches to about 450-inches.

11. The electric aircraft of claim 1, wherein each tip of the forward wing comprises a split divergent winglet.

12. The electric aircraft of claim 1, wherein each end of the aft wing comprises a split winglet with an upward portion angled upwardly from a tip of the aft wing and a downward portion angled downwardly from the tip of the aft wing.

13. An electric aircraft, comprising:
a forward wing on a top side of a fuselage, wherein the forward wing comprises a fixed wing having an upward dihedral angle;
an aft wing on the top side of the fuselage, wherein the aft wing comprises a fixed wing having an upward dihedral angle, a swept leading edge, and a swept trailing edge;
a plurality of forward propeller engines on the forward wing, wherein the forward propeller engines each comprise an electric motor;
a plurality of aft propeller engines on the aft wing, wherein the aft propeller engines each comprise an electric motor;
wherein the forward propeller engines and the aft propeller engines are each configured as fixed orientation rotors;
a cockpit door located forward of the forward wing;
an unobstructed cargo door located on a side of the fuselage aft of the forward wing, wherein the unobstructed cargo door is configured for loading and unloading cargo therethrough; and
a main landing gear, wherein the main landing gear is located aft of the unobstructed cargo door.

14. The electric aircraft of claim 13, wherein the forward wing comprises a straight unswept leading edge and a trailing edge that is angled forward such that the forward wing becomes narrower towards a tip of the wing.

15. The electric aircraft of claim 13, wherein the forward propeller engines are disposed on the leading edge side of the forward wing and configured as tractor propeller engines to pull the aircraft forward.

16. The electric aircraft of claim 15 comprising six propeller engines on the forward wing.

17. The electric aircraft of claim 13, wherein the aft propeller engines are disposed on a leading edge side of the aft wing and configured as tractor propeller engines to pull the aircraft forward.

18. The electric aircraft of claim 17 comprising six propeller engines on the aft wing.

19. The electric aircraft of claim 13, wherein the aft propeller engines are disposed on a trailing edge side of a wing and configured as pusher propeller engines to push the aircraft forward.

20. The electric aircraft of claim 19 comprising four propeller engines on the aft wing.

21. The electric aircraft of claim 13, wherein each tip of the forward wing comprises a split divergent winglet, and each end of the aft wing comprises a split winglet.

* * * * *